March 2, 1965 S. P. RONZHEIMER 3,172,053

BALANCED FREQUENCY DETECTOR CIRCUIT

Filed Jan. 24, 1961

3,172,053

BALANCED FREQUENCY DETECTOR CIRCUIT

Stephen P. Ronzheimer, Elmhurst, Ill., assignor to Hazeltine Research Inc., a corporation of Illinois Filed Jan. 24, 1961, Ser. No. 84,632
12 Claims. (Cl. 329—134)

Figure 1:
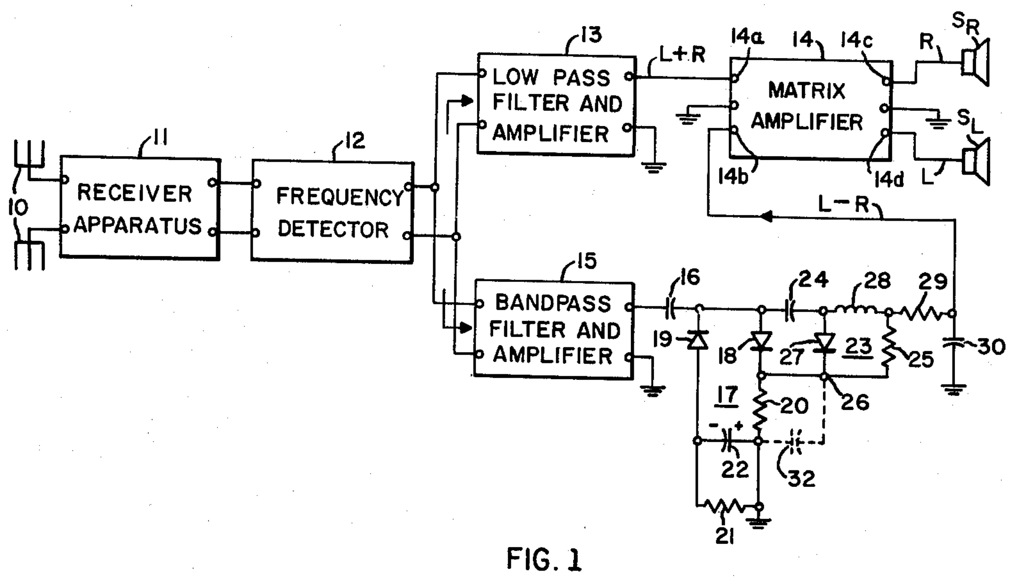

This invention relates to a balanced frequency detector circuit for use in the subcarrier channel of an FM/FM multiplex radio receiver. It is contemplated that the invention will be useful in receivers adapted to reproduce either stereophonic or subscription-type SCA (Subsidiary Communications Authorization) broadcast signals.

An FM/FM multiplex signal may consist of a main carrier frequency signal in the standard FM broadcast band of 88–108 megacycles, which is frequency-modulated by a subcarrier frequency signal of, for example, 42 kilocycles. Both the main carrier and subcarrier signals are frequency-modulated by respective audio-frequency information signals which, for convenience, will be referred to according to the carriers on which they are directly modulated. In the case of a stereophonic broadcast signal, the two information signals may be the left and right halves of a single program source, or certain matrixed combinations thereof designed to permit compatible reception of both halves of the program source by conventional FM receivers. In the case of an SCA broadcast signal, the two information signals usually come from totally unrelated program sources, as, for example, where the main information signal may be a program intended for home receivers, while the subcarrier information signal may be continuous background music for use by stores subscribing to this special service.

A radio adapted to receive either type multiplex broadcast signal has a frequency detector for detecting the main information signal and the modulated subcarrier signal. The main information signal may then be filtered out and utilized directly. However, in order to utilize the subcarrier information signal, an additional signal-translating channel including a bandpass filter (to exclude the main information signal) and another frequency detector (to demodulate the subcarrier) is provided. This additional or subcarrier channel should be capable of producing, at the output thereof, a good, clean information signal without any part of the main information signal appearing therein. When some of the main information signal does occur in the output of the subcarrier channel, there is said to be crosstalk of the main information signal into the subcarrier channel.

This crosstalk can result from amplitude modulation of the subcarrier at an audio rate corresponding to the audio frequencies of the main information signal, which modulation is completely suppressed either by the subcarrier frequency detector or by the amplitude limiter associated therewith. While the frequency detector operates to produce an output signal that is proportional to the deviation in frequency of the subcarrier from its mean value, it may also be inherently amplitude-sensitive and, therefore, produces an additional output signal component that is proportional to the amplitude variations in the subcarrier.

Such amplitude modulation may occur in receivers having rounded-top IF (intermediate-frequency) bandpass characteristics. Also, even in receivers having flat-top IF characteristics, frequency deviation of the main carrier produced by the main information signal may be sufficiently large to cause the sidebands corresponding to the subcarrier frequencies to ride up and down the sloping sides of the IF pass bands, thereby varying the amplitude of the subcarrier frequency components appearing at the input of the subcarrier detector.

The subjective effect of the listener of this undesired crosstalk depends upon the type of broadcast signal being received. In the case of a stereophonic broadcast signal, it may result in a reduction in stereophonic separation, a loss of stereophonic balance, or combinations of both, depending on the type of matrixing used in the respective information signals. In the case of the SCA subscription-type signals, the listener may actually hear the main program simultaneously with the subcarrier program. Although the main program may come through at a substantially reduced volume relative to the subcarrier program, it is often sufficiently loud to cause annoying interference. This is especially true where the main program is a voice, since voices have been found to produce one of the more noticeable forms of interference.

In copending application Serial No. 84,667, filed January 24, 1961, now Patent No. 3,128,437, issued April 7, 1964, there is described a balanced frequency detector circuit which is particularly effective in eliminating crosstalk of the main program into the subcarrier channel of an FM/FM multiplex receiver. Very briefly, in that circuit a variable threshold limiter is used to amplitude-limit the modulated subcarrier signal and a special pulse-counter frequency detector is used to detect the subcarrier information signal. In the pulse counter, a series of pulses is derived that has an average amplitude component indicative of both the subcarrier frequency modulation and the undesired subcarrier amplitude modulation. To eliminate the effect caused by the subcarrier amplitude modulation, an auxiliary amplitude detector is coupled across the pulse-counter circuit to detect the amplitude modulation of the limited signal and subtract it from the output of the pulse-counter circuit, thereby making the average component of the derived pulses indicative only of the subcarirer audio-frequency information signal.

The present invention utilizes the variable threshold limiter and pulse-counter circuit of the above-mentioned application but incorporates a modification in the manner in which the amplitude modulation effect is removed from the pulse train.

It is, therefore, an object of the present invention to provide a balanced frequency detector circuit for the subcarrier channel of an FM/FM multiplex signal receiver that avoids the foregoing difficulty of multiplex signal reception.

It is also an object of the present invention to provide an inexpensive and simply constructed balanced subcarrier channel frequency detector.

It is further an object of the present invention to provide, for the subcarrier channel of a multiplex signal receiver, an inexpensive balanced frequency detector with good amplitude-modulation rejection and that has linearity and sensitivity characteristics comparable to more expensive subcarrier frequency detectors.

It is finally an object of the present invention to provide a balanced subcarrier channel frequency detector that does not require additional rectifier elements in the balancing circuit of the detector.

In accordance with the present invention, a balanced frequency detector circuit for the subcarrier channel of an FM/FM multiplex signal receiver comprises means for supplying a subcarrier signal which may be both frequency and amplitude modulated, and means for amplitude-limiting the subcarrier, such means including impedance means for deriving a measure of the abovementioned subcarrier amplitude modulation. The balanced frequency detector circuit also includes means for deriving from the limited signal a series of pulses having an average amplitude component determined by both the foregoing frequency and amplitude modulation of the subcarrier. Finally, the detector includes means for utilizing the measure of amplitude modulation derived in the amplitude-limiting means to substantially reduce the effect the subcarrier amplitude modulation has on the average amplitude component of the pulse series.

For a better understanding of the present invention, together with other and further objects thereof, reference is had to the following description taken in connection with the accompanying drawing, and its scope will be pointed out in the appended claims.

Figure 2:
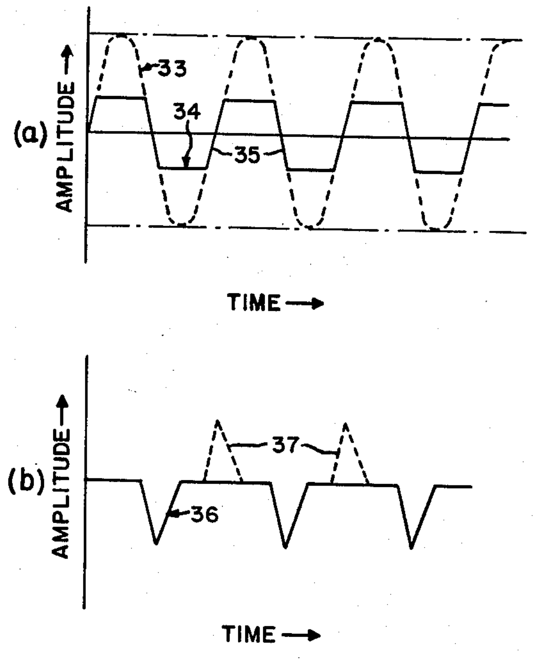
Figure 3:
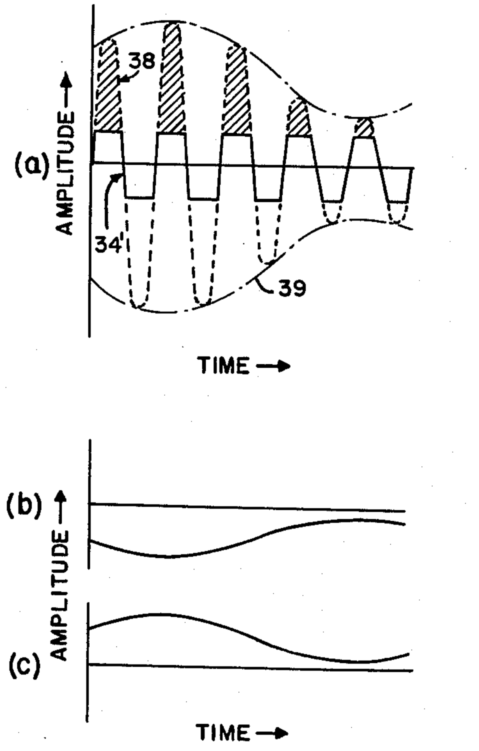

Referring to the drawing:

FIG. 1 is a combination block and circuit diagram of an FM/FM multiplex receiver specifically adapted to receive a stereophonic broadcast signal and which incorporates in the subcarrier channel a balanced frequency detector circuit constructed in accordance with the present invention, and FIGS. 2 and 3 are diagrams useful in explaining the operation of the FIG. 1 balanced frequency detector circuit.

*General description of FIG. 1 receiver*

The receiver of FIG. 1 is constructed to receive a particular form of the above-described FM/FM multiplex broadcast signal, namely the stereophonic broadcast signal. Further, it is assumed that this stereophonic signal is of the type wherein the main carrier information signal is the sum of the left and right halves, $L+R$, of the program source and the subcarrier information signal is the difference between the two, $L-R$. This arrangement of the signal permits reproduction of the complete program with a conventional monaural FM receiver, which operates to detect the main carrier signal, $L+R$, and ignores the subcarrier signal completely. To reproduce the program stereophonically, a special receiver is required and it may be constructed in accordance with FIG. 1.

The receiver shown in FIG. 1 includes antenna system 10, coupled to the input of receiver apparatus 11 which may incorporate the usual radio-frequency amplifier, frequency converter, intermediate-frequency amplifier, and amplitude limiter circuits associated with conventional monaural FM receivers. The multiplex signal is then applied from the last intermediate-frequency amplifier stage of apparatus 11 to the input of frequency detector 12 comprising either a discriminator or ratio detector for detecting the audio-frequency information signal $L+R$ and the modulated subcarrier. The composite signal from the output of detector 12 is then applied to the input of low-pass filter and amplifier 13 preferably having a pass band sufficient to translate only the audio-frequency signal, $L+R$. The signal $L+R$ is then coupled to one input terminal 14*a* of matrix amplifier 14, which unit is included for a purpose to be described hereinafter.

The composite detected signal at the output of detector 12 is also applied to the input of bandpass filter and amplifier 15, which should have a bandpass characteristic centered on the subcarrier frequency and a bandwidth capable of translating all the frequency-modulation components of the subcarrier. Also, the bandpass filter of unit 15 should be carefully designed at the lower end of the passband to substantially attenuate any of the higher audio-frequency components of the main signal $L+R$, thereby to prevent any direct feedthrough of the signal $L+R$ into the subcarrier channel. A buffer amplifier stage may be located between detector 12 and the bandpass filter of unit 15 and, if included, should be designed for linear operation since some harmonics of the audio-frequency signal, $L+R$, produced by nonlinear operation of the amplifier may fall within the pass band of the filter and be translated into the subcarrier channel. The modulated subcarrier at the output of unit 15 is then limited and detected by means of units 17, and 23, in a manner to be fully described hereinafter, to produce the audio-frequency subcarrier information signal $L-R$ which is then applied to a second input terminal 14*b* of matrix amplifier 14.

Th esignals $L+R$ and $L-R$ at matrix input terminals 14*a* and 14*b*, respectively, cannot be used directly for stereophonic sound reproduction since each signal effectively has both the left and right halves of the program source represented therein. The two signals must be suitably combined to produce the separate signals L and R. This can be done simply by adding the two signals to produce the left half signal L and by subtracting the signal $L-R$ from the signal $L+R$ to produce the right half signal R. Thus, unit 14 may include conventional adder and subtractor circuits to combine signals $L+R$ and $L-R$ in the manner just described to produce the signal R at output terminal 14*c* and the signal L at output terminal 14*d*. Amplifier stages may be included in unit 14 to raise the level of the signals R and L to a suitable value for their direct application to right and left speakers $S_R$ and $S_L$, respectively.

It should be emphasized that a stereophonic receiver has been shown by way of illustration only and that the balanced frequency detector of the invention, hereinafter described, will be equally useful in any form of FM/FM multiplex receiver, regardless of whether the main information signal is actually utilized.

*Description of FIG. 1 balanced frequency detector circuit*

That portion of the subcarrier channel that is used to detect the audio-frequency signal $L-R$ from the subcarrier signal in accordance with the invention will now be considered. Specifically, there is provided a balanced frequency detector circuit which includes means such as unit 15 for supplying the above-described subcarrier signal. In accordance with the stereophonic system of FIG. 1, the subcarrier signal is frequency-modulated by the information signal $L-R$ and, under ideal circumstances, this would be the only modulation of the subcarrier. However, as it has been previously explained, the subcarrier signal may also be amplitude-modulated by a second signal which may correspond to the main carrier audio-frequency signal $L+R$.

This frequency- and amplitude-modulated subcarrier signal at the output of unit 15 is applied through capacitor 16 to variable threshold limiter circuit 17, which limits the amplitude of the subcarrier signal in proportion to the strength thereof. Specifically, limiter circuit 17 produces a symmetrical square-wave signal having a repetition rate varying with the frequency modulation of the subcarrier and a peak-to-peak amplitude that is a fixed percentage of the peak-to-peak amplitude of the applied subcarrier signal. To this end, limiter circuit 17 comprises one circuit branch including diode 18, conductively coupled from capacitor 16 through resistor 20 to ground, to clip off a portion of the positive peaks of the applied subcarrier, and another circuit branch including diode 19, conductively coupled from ground through a parallel combination of load resistor 21 and capacitor 22 back to capacitor 16 to clip off a portion of the negative peaks.

The level at which limiter circuit 17 clips a subcarrier signal is determined by the value of resistor 21 and this clipping level is arranged to be a fixed percentage of the average peak-to-peak amplitude of the supplied subcarrier. The characteristics of the circuit used to drive the limiter circuit have an effect on the foregoing operation of the limiter. In an actually constructed embodiment of the invention the limiter is coupled to the plate of a pentode amplifier circuit which preferably has a high inductive plate load impedance comprising a coil of approximately 50 millihenries. In selecting the value of resistor 21, a compromise must be made between higher output with a higher value resistance and better downward AM handling capability with a lower value. Bypass capacitor 22, connected across resistor 21, holds the clipping level relatively constant in the presence of incidental amplitude modulation occurring at an audio-frequency rate and, therefore, its value should be selected relative to that of resistor 21 to provide a time constant that is several times the period of an audio-frequency signal. A time constant of 0.2 second is suitable.

Variable threshold limiter circuit 17 is included so that if there are any desired long-term variations in the amplitude of the composite signal at the output of the first frequency detector 12, that directly result in corresponding variations of the main audio-frequency information signal $L+R$ at matrix input terminal 14*a*, they will be accompanied by corresponding variations in the amplitude of the subcarrier audio-frequency signal $L-R$ at matrix input terminal 14*b*, thereby ensuring proper stereophonic operation of the receiver. This aspect of the stereophonic receiver of FIG. 1 constitutes the subject matter of copending application Serial No. 89,895, filed January 24, 1961.

As previously described, the subcarrier from unit 15 may be amplitude-modulated, and limiter circuit 17 is not capable of suppressing all the effects of this amplitude modulation. Thus, in addition to the usual frequency-modulation components, the limited signal applied to the input of pulse-counter circuit 23 also has some undesired amplitude-modulation effects which can be detected by circuit 23 and cause interference in the output thereof. For this reason, an impedance, such as resistor 20, is included in one branch of limiter circuit 17 for deriving thereacross a measure of these amplitude-modulation effects. In particular, diode 18 and resistor 20 together form an amplitude detector for developing across resistor 20 a voltage varying with the amplitude modulation of the applied subcarrier signal. This varying voltage is then used to provide balanced operation of the subcarrier frequency detector. For improving the balancing operation at high audio-frequencies, a bypass capacitor 32 may be added across resistor 20 and may be considered as an integral part of the foregoing impedance.

The balanced frequency detector circuit of the invention may also include an improved form of pulse-counter circuit 23 for deriving from the limited signal a train of pulses having an average amplitude component determined by both the frequency- and amplitude-modulation of the subcarrier, the effect of the amplitude-modulation not having been completely suppressed by limiter circuit 17. In pulse-counter circuit 23, a differentiator circuit consisting of capacitor 24 and resistor 25 is connected in series with an inductor 28 for deriving a train of positive and negative pulses from the leading and trailing edges of the square-wave limited signal from limiter circuit 17. Diode 27 is conductively connected from capacitor 24 to terminal 26 to remove the positive pulses and to clamp the base of the remaining train of negative pulses at the potential existing at terminal 26. Insofar as the operation of circuit 23 as a pulse-counter is concerned, the potential at terminal 26 may be assumed to be fixed, for example, at ground. Inductor 28 is included in the series circuit of capacitor 24 and resistor 25 for the purpose of waveshaping the differentiated pulses to increase their area and, in conjunction with diode 27, to provide a sharp cutoff at the end of each pulse as compared to the lengthy delay time of the differentiated pulses. In this way, the audio recovery capability (i.e. sensitivity) and linearity of circuit 23 is improved over conventional pulse-counter circuits. This feature of the circuit of FIG. 1 is the subject matter of copending application Serial No. 84,636, filed January 24, 1961.

A de-emphasis circuit 29, 30 is added in a conventional manner to the output of pulse counter circuit 23 to serve the dual function of compensating for pre-emphasis of the higher audio-frequencies at the transmitter and of filtering out the components of the pulse train occurring outside the audio-frequency range.

The balanced frequency detector also includes means for utilizing the varying voltage developed across resistor 20 to substantially reduce the effect the subcarrier amplitude modulation has on the average amplitude component of the pulse train derived in counter circuit 23. This means may comprise simply the connection from the junction of resistor 20 and diode 18 to terminal 26 of the counter circuit.

*Operation of balanced frequency detector circuit of FIG. 1*

Referring to FIG. 2, the operation of the balanced frequency detector circuit of FIG. 1 will first be considered assuming the presence of an unmodulated subcarrier at the input of bandpass filter and amplifier unit 15. That is to say, the subcarrier shown by dash line 33 of FIG. 2*a* is neither frequency- nor amplitude-modulated. It is applied to limiter circuit 17, wherein a symmetrical square-wave signal represented by solid line 34 is produced. The negative pulses represented by solid line 36 of FIG. 2*b* are then derived across resistor 25 from the limited signal with the positive pulses 37 being clipped off by diode 27. In line with conventional pulse-counter operation, as long as the area of each of the negative pulses 36 remains constant, the average value of the pulse train is then directly proportional to the pulse-repetition rate. Thus, when the repetition rate varies as a function of subcarrier frequency modulation, dynamic variations in the amplitude of the average value of the pulses are produced, which constitute the audio-frequency signal $L-R$. Since this example assumes that the area of the pulses remains constant, these dynamic variations of the average value of the pulses are strictly representative of the frequency modulation of the subcarrier and no cross-talk is produced.

However, in the case where the area of the pulses is not instant, the average amplitude of the pulse train is determined both by the changes in the pulse-repetition rate and the changes in the pulse area. In the case where the amplitude-limiter circuit does not perfectly limit the subcarrier, which is not altogether an unusual situation, the area of the pulses is caused to vary with changes in amplitude of the subcarrier, thus introducing distortion into the detected subcarrier information signal $L-R$, as shown in FIG. 3*b*. FIG. 3*b* shows the variation in the average value of the pulse train resulting from amplitude modulation of the subcarrier, as illustrated in FIG. 3*a*.

To cancel out this distortion of the subcarrier audio signal caused by amplitude modulation of the subcarrier at an audio rate, resistor 20 is placed in series with diode 18 to take advantage tof the fact that diode 18 conducts during a greater percentage of the subcarrier cycle, and to a greater extent, at peaks of the amplitude modulation than at the troughs, as illustrated by the shaded areas under dash line 38 in FIG. 3*a*. Thus, a direct measure of the amplitude modulation, comprising a modulation-frequency voltage as shown in FIG. 3*c*, is developed across resistor 20 as a result of this current variation in diode 18, and by suitably choosing the value of resistor 20 to make the detected voltage of FIG. 3*c* equal in amplitude to that of FIG. 3*b*, the desired cancellation is produced simply by connecting resistor 20 to resistor 25. Capacitor 32, added across resistor 20, keeps the resistor from interfering with the clipping of the subcarrier in limiter circuit 17. To this end, its value is large enough to provide a bypass of resistor 20 at subcarrier frequencies, while at the same time being small enough to enable the voltage across resistor 20 to follow audio-frequency variations in the amplitude of the subcarrier.

While applicant does not wish to be limited to any particular set of circuit constants, the following have proved useful in the balanced frequency detector circuit of FIG. 1:

| | |
|---|---|
| Resistor **20** | 500 ohms (adjustable). |
| Resistor **21** | 27 kilohms. |
| Resistor **25** | 33 kilohms. |
| Resistor **29** | 100 kilohms. |
| Capacitor **16** | 0.1 microfarad. |
| Capacitor **22** | 8.0 microfarads. |
| Capacitor **24** | 100 micromicrofarads. |
| Capacitor **30** | 1500 micromicrofarads. |
| Capacitor **32** | 0.047 microfarad. |
| Inductor **28** | 50 millihenries. |
| All diodes | Type 1N34AS. |

While there has been described what is at present considered to be the preferred embodiment of this invention, it will be obvious to those skilled in the art that various changes and modifications may be made therein without departing from the invention and it is, therefore, aimed to cover all such changes and modifications as fall within the true spirit and scope of the invention.

What is claimed is:

1. A balanced frequency detector circuit for the subcarrier channel of an FM/FM multiplex signal receiver comprising: means for supplying a subcarrier signal which may be both frequency- and amplitude-modulated; means for amplitude-limiting the subcarrier, and including impedance means for deriving a measure of said subcarrier amplitude-modulation; means for deriving from the limited signal a series of pulses having an average amplitude component determined by both said frequency- and amplitude-modulation of the subcarrier; and means for utilizing said derived measure of amplitude-modulation to substantially reduce the effect the subcarrier amplitude-modulation has on the average amplitude component of the pulse series.

2. A balanced frequency detector circuit for the subcarrier channel of an FM/FM multiplex signal receiver comprising: means for supplying a subcarrier signal which may be both frequency- and amplitude-modulated, said amplitude-modulation being at an audio-frequency rate; means for amplitude-limiting said subcarrier in proportion to the average amplitude thereof and including therein an impedance for deriving a measure of said subcarrier amplitude-modulation; means for deriving from the limited signal a series of pulses having an average amplitude component determined by both said frequency- and amplitude-modulation of the subcarrier; and means for utilizing said derived measure of amplitude-modulation to substantially reduce the effect the subcarrier audio-frequency amplitude-modulation has on the average component of the pulse series.

3. A balanced frequency detector circuit for the subcarrier channel of an FM/FM multiplex signal receiver comprising: means for supplying a subcarrier signal which may be both frequency- and amplitude-modulated; means for amplitude-limiting said subcarrier, and including impedance means for deriving a measure of said subcarrier amplitude-modulation; means for deriving from the limited signal a series of pulses having an average amplitude component determined by both said frequency- and amplitude-modulation of the subcarrier; and means connecting said impedance means to said pulse-deriving circuit for utilizing said derived measure of amplitude-modulation to substantially reduce the effect the subcarrier amplitude-modulation has on the average amplitude component of the pulse series.

4. A balanced frequency detector circuit for the subcarrier channel of an FM/FM multiplex signal receiver comprising: means for supplying a subcarrier signal which may be both frequency- and amplitude-modulated; an amplitude-limiter circuit responsive to said supplied subcarrier signal and including a pair of circuit branches, each adapted to clip off a portion of said subcarrier signal, said limiter circuit including impedance means for deriving thereacross a measure of said subcarrier amplitude-modulation; means for deriving from the limited signal a series of pulses having an average amplitude component determined by both said frequency- and amplitude-modulation of the subcarrier; and means for utilizing said derived measure of amplitude-modulation to substantially reduce the effect the subcarrier amplitude-modulation has on the average amplitude component of the pulse series.

5. A balanced frequency detector circuit for the subcarrier channel of an FM/FM multiplex signal receiver comprising: means for supplying a subcarrier signal which may be both frequency- and amplitude-modulated; an amplitude-limiter circuit responsive to said supplied subcarrier signal and including a pair of circuit branches, each adapted to clip off a portion of said subcarrier signal, one of said circuit branches including an impedance for deriving thereacross a measure of said subcarrier amplitude-modulation; means for deriving from the limited signal a series of pulses having an average amplitude component determined by both said frequency- and amplitude-modulation of the subcarrier; and means for utilizing said measure of amplitude-modulation to substantially reduce the effect the subcarrier amplitude-modulation has on the average amplitude component of the pulse series.

6. A balanced frequency detector circuit for the subcarrier channel of an FM/FM multiplex signal receiver comprising: means for supplying a subcarrier signal which may be both frequency- and amplitude-modulated; an amplitude-limiter circuit responsive to said supplied subcarrier signal and including a pair of circuit branches, each adapted to clip off a portion of said subcarrier signal, said limiter circuit including impedance means including a resistor for deriving thereacross a measure of said sub-carrier amplitude-modulation; means for deriving from the limited signal a series of pulses having an average amplitude component determined by both said frequency- and amplitude-modulation of the subcarrier; and means connecting said impedance means to said pulse-deriving circuit for utilizing said derived measure of amplitude-modulation to substantially reduce the effect the subcarrier amplitude-modulation has on the average amplitude component of the pulse series.

7. A balanced frequency detector circuit for the subcarrier channel of an FM/FM multiplex signal receiver comprising: means for supplying a subcarrier signal which may be both frequency- and amplitude-modulated; an amplitude-limiter circuit responsive to said supplied subcarrier signal and including a pair of circuit branches adapted to clip off, symmetrically, positive and negative portions of said subcarrier signal, said limiter circuit including impedance means for deriving thereacross a measure of said subcarrier amplitude-modulation; means for deriving from the limited signal a series of pulses having an average amplitude component determined by both said frequency- and amplitude-modulation of the subcarrier; and means for utilizing said derived measure of amplitude-modulation to substantially reduce the effect the subcarrier amplitude-modulation has on the average amplitude component of the pulse series.

8. A balanced frequency detector circuit for the subcarrier channel of an FM/FM multiplex signal receiver comprising: means for supplying a subcarrier signal which may be both frequency- and amplitude-modulated; means for amplitude-limiting said subcarrier and including impedance means for deriving a measure of said subcarrier amplitude-modulation; means for deriving from the limited signal a series of pulses with their base line clamped to a variable voltage level, said pulses having an average amplitude component, relative to said level, determined by both said frequency- and amplitude-modulation of the subcarrier; and means for utilizing said derived measure of amplitude-modulation to vary said voltage level to substantially reduce, relative to a fixed voltage level, that portion of said average amplitude component determined by said sub-carrier amplitude-modulation.

9. A balanced frequency detector circuit for the subcarrier channel of an FM/FM multiplex signal receiver comprising: means for supplying a subcarrier signal which may be both frequency- and amplitude-modulated; an amplitude-limiter circuit responsive to said supplied subcarrier signal and including a pair of circuit branches, each adapted to clip off a portion of said subcarrier signal, said limiter circuit including impedance means for deriving thereacross a measure of said subcarrier amplitude-modulation; means for deriving from the limited signal a series of pulses with their base line clamped to a variable voltage level, said pulses having an average amplitude component, relative to said level, determined by both said frequency- and amplitude-modulation of the subcarrier; and means for utilizing said derived measure of amplitude-modulation to vary said voltage level to substantially reduce, relative to a fixed voltage level, that portion of said average amplitude component determined by said subcarrier amplitude-modulation.

10. A balanced frequency detector circuit for the subcarrier channel of an FM/FM multiplex signal receiver comprising: means for supplying a subcarrier signal which may be both frequency- and amplitude-modulated; an amplitude-limiter circuit responsive to said supplied subcarrier signal and including a pair of circuit branches adapted to clip off, symmetrically, positive and negative portions of said subcarrier signal, said limited circuit including impedance means for deriving thereacross a measure of said subcarrier amplitude-modulation; means for deriving from the limited signal a series of pulses with their base line clamped to a variable voltage level, said pulses having an average amplitude component, relative to said level, determined by both said frequency- and amplitude-modulation of the subcarrier; and means for ultilizing said derived measure of amplitude-modulation to vary said voltage level to substantially reduce, relative to a fixed voltage level, that portion of said average amplitude component determined by said subcarrier amplitude-modulation.

11. A balanced frequency detector circuit for the subcarrier channel of an FM/FM multiplex signal receiver comprising: means for supplying a subcarrier signal frequency-modulated by a first signal and amplitude-modulated by a second signal; an amplitude-limiter circuit responsive to said supplied subcarrier signal and including a pair of circuit branches adapted to clip off, symmetrically, positive and negative portions of said subcarrier signal extending beyond a voltage level that is proportional to the amplitude of the supplied subcarrier signal, said limiter circuit including impedance means in one of said branches for deriving thereacross a measure of said subcarrier amplitude-modulation; means for deriving from the limited signal a series of pulses having an average amplitude component determined by both said frequency- and amplitude-modulation of the subcarrier; and means for utilizing said derived measure of amplitude-modulation to substantially reduce the effect the subcarrier amplitude-modulation has on the average amplitude component of the pulse series.

12. A balanced frequency detector circuit for the subcarrier channel of an FM/FM multiplex signal receiver comprising: means for supplying a subcarrier signal which may be both frequency- and amplitude-modulated; an amplitude-limiter circuit responsive to said supplied subcarrier signal and including a pair of circuit branches, each including a rectifier device and being adapted to clip off a portion of said subcarrier signal, one of said circuit branches including an impedance which, together with the rectifier device thereof, forms an amplitude detector for developing a voltage across the impedance representative of said amplitude-modulation; means for deriving from the limited signal a series of pulses having an average amplitude component determined by both said frequency- and amplitude-modulation of the subcarrier; and means for utilizing said valtage developed across said impedance to substantially reduce the effect the subcarrier amplitude-modulation has on the average amplitude component of the pulse series.

References Cited in the file of this patent

UNITED STATES PATENTS

| | | |
|---|---|---|
| 2,379,688 | Crosby | July 3, 1945 |
| 2,399,091 | Bingley et al | Apr. 23, 1946 |
| 2,441,957 | De Rosa | May 25, 1948 |
| 2,744,247 | Wilmotte | May 1, 1956 |
| 3,059,189 | Preisig | Oct. 16, 1962 |
| 3,080,453 | Avins | Mar. 5, 1963 |